Sept. 15, 1931.  O. V. EDGERTON  1,823,825
ROAD MAP FOR AUTOMOBILES
Filed April 29, 1930   2 Sheets-Sheet 2
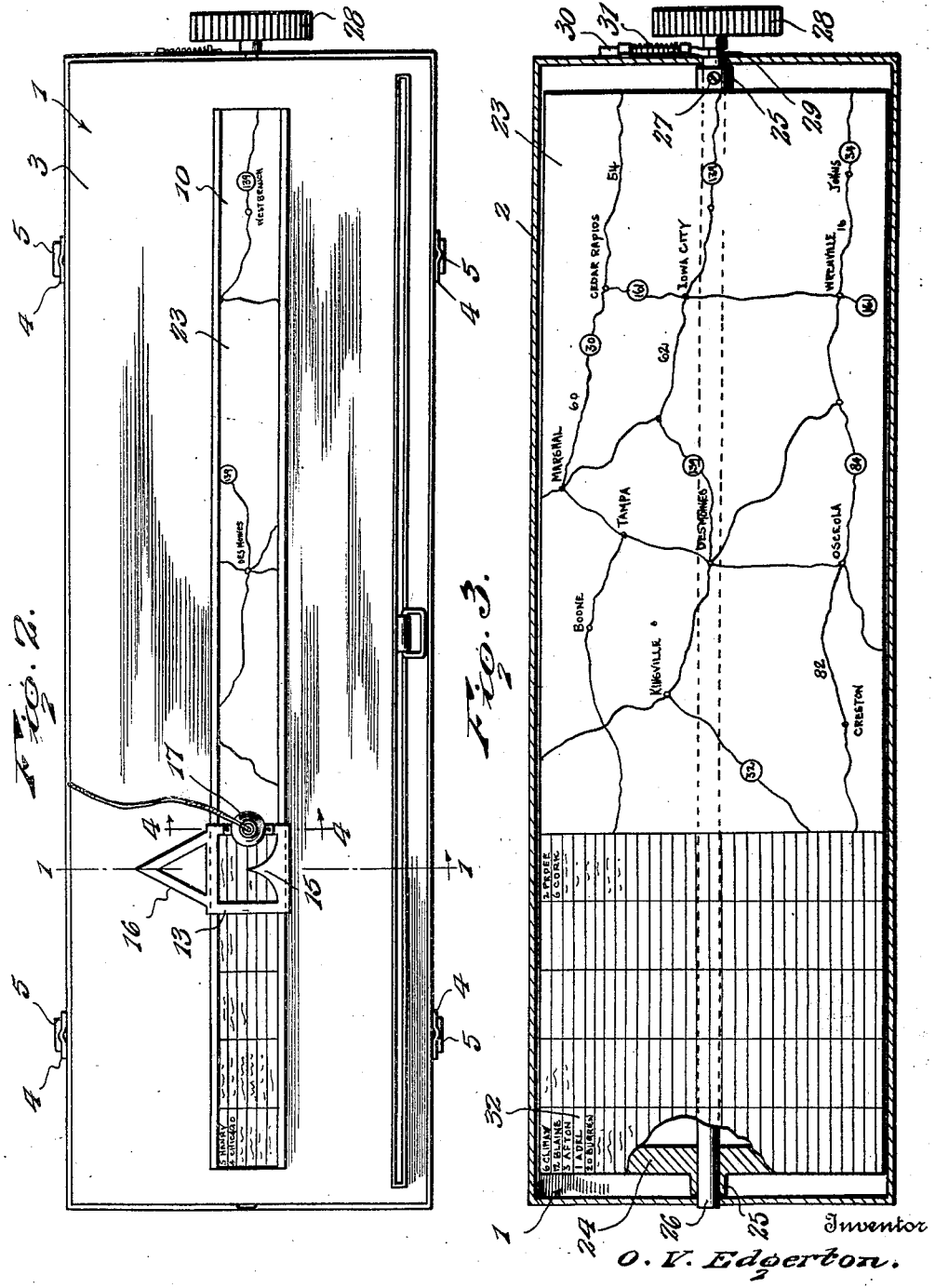

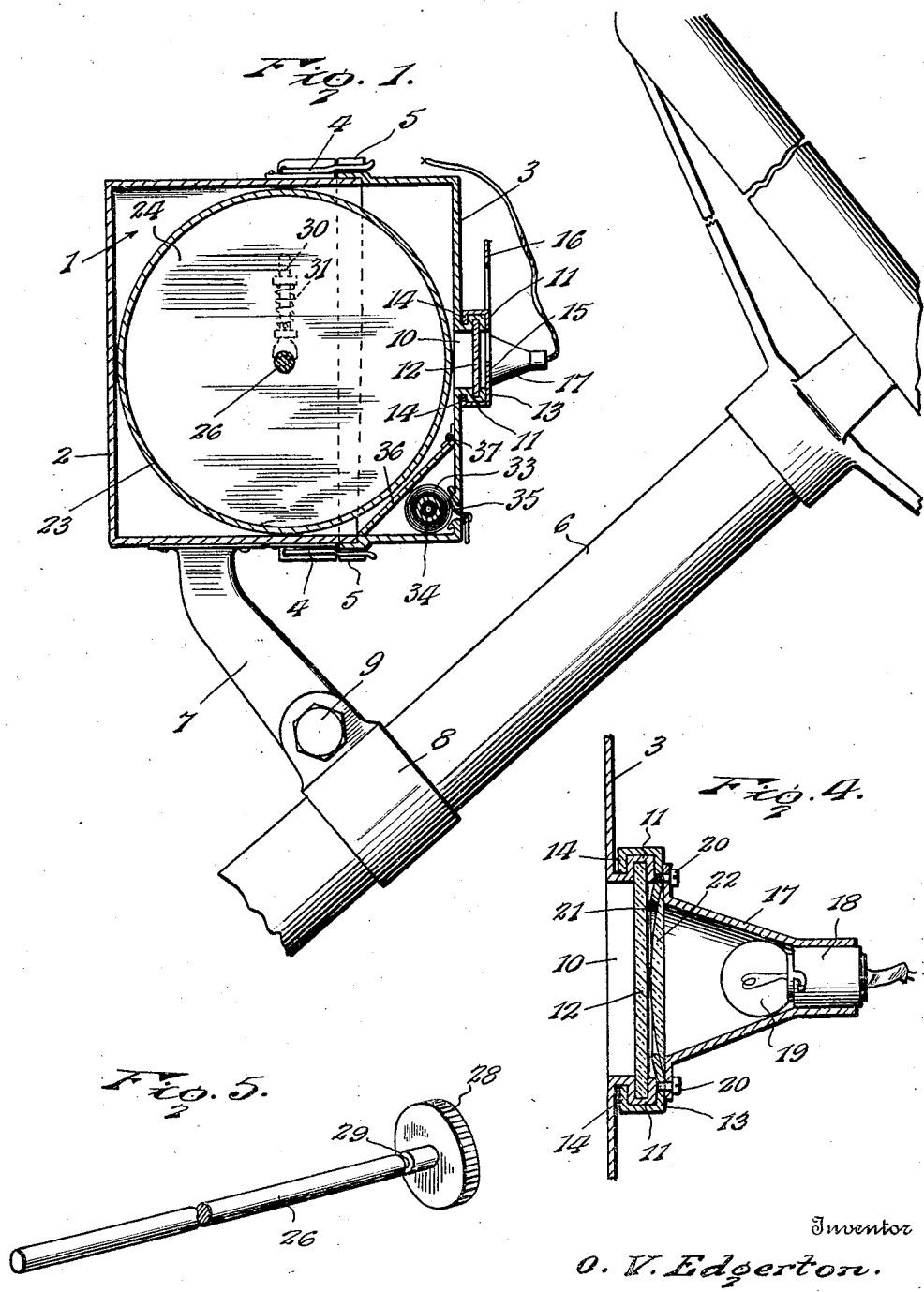

Patented Sept. 15, 1931

1,823,825

UNITED STATES PATENT OFFICE

ORLANDO V. EDGERTON, OF WEST BRANCH, IOWA

ROAD MAP FOR AUTOMOBILES

Application filed April 29, 1930. Serial No. 448,387.

This invention relates to road maps and more particularly to a road map constituting an accessory for an automobile and adapted to be mounted in such a position that it may be readily consulted by the driver or another occupant of an automobile.

At the present time it is customary for a person making a trip by automobile to obtain a chart or charts of the territory through which he intends to travel so that towns through which he passes may be identified and their location with respect to other towns and cities and the most direct path of travel between them ascertained. These maps or charts are usually in the form of flat sheets which are folded and put away when not in use and it has been found that the maps very often become badly soiled and very often cracked or torn to such an extent that they are no longer serviceable. It has also been found that since it is necessary to unfold a map to a flattened position an automobile must be stopped in order that a map may be inspected and towns located and the proper roads for reaching them identified.

Therefore, one object of the invention is to provide a road map of such construction that it may be mounted upon the steering column, instrument board or back of the front seat or over the windshield of an automobile where it will always be readily accessible when reference thereto is necessary and thereby allow the map to be very easily consulted either by the driver or another occupant of the automobile.

Another object of the invention is to provide a road map in which the chart is movably mounted in a casing or housing having a sight opening formed therein across which the chart passes when moved thereby preventing the face of the chart from becoming soiled while at the same time permitting it to be very easily inspected.

Another object of the invention is to provide a device of this character wherein the chart is in the form of a cylinder rotatably mounted in a housing and adapted to be rotated so that it moves across the sight opening of the housing thereby eliminating a flat sheet which must be folded in order to be conveniently stored when not in use and spread out flat while being consulted.

Another object of the invention is to provide the housing with a pointer movable along the sight opening so that a road along which an automobile is moving or a town recently passed or toward which the automobile is moving may be readily located and further to equip the device with a light mounted upon the pointer and adapted to illuminate the sight opening and the portion of the chart disclosed therethrough so that the chart may be easily seen at night time.

Another object of the invention is to so form the housing in which the cylinder is mounted that the housing may be easily opened thereby permitting a chart to be very easily and quickly removed and a new one set in place when the automobile has passed out of the territory shown upon a chart mounted in the housing.

Another object of the invention is to provide a device of this character wherein a map of an entire country or one State may be wound upon a roller within the housing and drawn out of the housing for inspection by the driver of the automobile when necessary.

The invention is illustrated in the accompanying drawings, wherein.

Figure 1 is a view showing the improved road map in transverse section and applied to the steering column of an automobile, Fig. 2 is a front elevation of the road map, Fig. 3 is a longitudinal sectional view through the road map, Fig. 4 is an enlarged fragmentary sectional view taken on the line 4—4 of Fig. 2 illustrating the construction of the light and the manner of slidably mounting the pointer, and Fig. 5 is a perspective view of the shaft by means of which the cylindrical chart is rotatably mounted.

The casing 1 of this improved road map may be formed of any suitable material but is preferably formed of sheet metal. This housing consists of a main section 2 and an auxiliary section 3 which has overlapping engagement with the walls of the main section and is removably secured by latches 4 carried by the main section and engaged with lugs 5 upon the walls of the auxiliary section. Therefore, the auxiliary section may be released and removed from the main section when access to the interior of the housing is necessary.

This housing may be attached to the instrument board of an automobile or to the back of the front seat where it may be observed by an occupant of the rear seat of the automobile, but in the present illustration it has been shown connected with the steering post 6 above and in front of the same where it may be easily seen by the driver of the automobile or a person occupying the front seat next to the driver. This is shown in Figure 1, and referring to this figure it will be seen that the main section of the housing carries a depending arm or bracket 7 having a clamp 8 at its lower end. This clamp is of a conventional construction and is adapted to be engaged about the steering post or column 6 and firmly secured thereon by tightening the bolts 9. While it has been stated that the road map is to be applied to a suitable portion of an automobile, it will be obvious that it will also be found very useful in a store for reference purposes when customers make inquiries concerning the most direct routes to certain towns or cities. When used indoors, the casing or housing may be set upon a table or upon any other suitable support. It will also be obvious that, while the device has been illustrated and described as a road map, it could be used for other purposes, such, for instance, as a radio log, telephone directory or the like.

The front or auxiliary section 3 of the casing has its front wall formed with a sight opening 10 through which a map or chart within the casing is to be viewed and along upper and lower edges of this sight opening extend ribs 11. These ribs are of a channeled formation and preferably consist of strips of metal cut from the wall and bent outwardly, as shown in Figure 1, when forming the sight opening. These ribs are U-shaped in cross section and since they are spaced from the outer face of the front wall of the auxiliary section they serve as mountings for a closure strip 12 of glass or other transparent material and also constitute tracks to slidably mount the frame 13 of a pointer. This pointer is also formed of sheet metal and is preferably rectangular in shape with its upper and lower bars formed with flanges 14 engaged about the ribs or tracks 11, as shown in Figure 4, and its lower bar has its intermediate portion extended upwardly to form a finger 15. A triangular head or arm 16 extends upwardly from the upper bar and serves as an element adapted to be grasped when it is desired to slide the pointer along the sight opening. This road map is intended to be used at night as well as during the day, and in order that it may be illuminated there has been provided a lamp housing or casing 17 having a socket 18 in its outer end to carry a bulb 19. This lamp housing is open at its inner end and is removably secured against one of the side bars of the pointer frame by screws 20. This side bar is formed to define a circular rim 21 against which marginal portions of the housing 17 engage and by this arrangement a lens 22 may be set in place and firmly secured at the inner end of the lamp housing. Therefore, the interior of the housing or casing 1 may be very well illuminated by light rays projected from the bulb 19 through the lens 22 and closure strip 12 into the map housing or casing.

The map or chart 23 is of a cylindrical formation, as clearly shown in Figure 1, and consists of a tubular body formed of any suitable material. If the body of the cylinder is formed of cardboard, the map may be printed directly upon the body but if this body is formed of metal the map will preferably be printed upon a sheet of paper and the sheet of paper disposed about the tubular body and pasted or otherwise secured thereon. A head 24 consisting of a circular disk is firmly secured in a suitable manner at each end of the tubular body and these heads are formed with hollow necks 25 to receive end portions of a rod or shaft 26. The rod or shaft extends axially through the body with its ends projecting from the necks and each neck carries a set screw 27 which, when tightened, will firmly hold the cylinder in a set position upon the shaft and cause it to rotate with the shaft. This shaft is engaged in seats formed in the end walls of the housing 1 before the auxiliary section is applied, and in the preferred construction the end walls of the housing are each formed with a circular opening to receive a projecting end of the shaft. One end portion of the shaft projects outwardly from the housing and carries a turning knob 28 and in spaced relation to this knob the shaft is formed with a circumferentially extending groove 29 constituting a seat to receive a latch 30. This latch is slidably mounted upon the adjacent end wall of the map housing and yieldably held in position to engage in the seat 29 by a spring 31. It will thus be seen that the latch will be yieldably held in an operative position but may be very easily and quickly moved to an inoperative position in order to release the shaft and permit the cylindrical map or chart to be removed together with its shaft and another map substituted when necessary.

When this map is in use, the housing 1 is mounted in a convenient position within an automobile and since the sight opening extends substantially the full width of the front wall the portion of the cylindrical map or chart exposed through the sight opening may be easily seen. This chart is printed or otherwise marked to represent roads leading from one town or city to another, as shown clearly in Figure 3, and also has one portion marked with columns in which the names of towns and cities shown upon the map are printed together with the distances in miles from one town to another, as shown at 32. By this arrangement a person traveling by automobile may locate a town or city upon the map and can very easily determine the most direct route from this town or city to another and the proper roads to follow. The main roads are numbered upon the map in accordance with numbers placed upon roads and city streets by automobile associations. If an extensive trip is being made, the pointer 13 is to be moved along its tracks as different towns and cities are passed thereby enabling the driver of the automobile to very easily and quickly keep track of his location and the name of the next town to be reached. Since the pointer carries a lamp which may be turned on and off by means of a suitable switch, the map may be inspected at night as easily as it can during the daytime. Each map or chart is drawn upon a large scale and preferably covers only a portion of a State. Therefore, if an extensive trip is made, a number of charts covering different districts will be obtained before starting upon a trip and each set in place at the proper time.

In some cases, it is desirable to have information covering more territory than a single cylindrical chart or map and, therefore, the auxiliary section carries in its lower portion a small scale map 33 covering an entire State or, if so desired, an entire country. This map 33 is wound upon a spring roller 34 which extends longitudinally of the auxiliary section. The free end of the rolled map projects outwardly through a slot 35 formed near the lower edge of the outer wall of the auxiliary section and since the spring roller is mounted similar to the manner in which curtain rollers are mounted the map may be drawn outwardly through the slot 35 and after being inspected may be released and allowed to rewind upon its roller. A shield consisting of a metal strip of sheet 36 is hinged to the front wall of the auxiliary section, as shown at 37, and normally rests upon the bottom of the auxiliary section. This shield extends the full width of the housing and will serve very effectively to prevent the map from becoming soiled or otherwise damaged. When it is necessary to replace the rolled map with another, the auxiliary section is detached and by swinging the shield upwardly the map together with its roller may be easily removed and another set in place.

If so desired, the map or columns of city names and distances in miles between them may extend the full width of the cylinder in which case either type of cylinder will be used according to which type is preferred by the operator of the automobile.

Having thus described the invention, I claim:

1. In a road map, a casing formed with a sight opening, a map movably mounted in said casing and having movement across the sight opening whereby selected portions of the map may be viewed through the sight opening, a transparent closure for the sight opening and an open frame slidable along said casing in front of said closure and provided with a finger whereby towns upon a portion of the map visible through the sight opening may be easily located.

2. In a road map, a casing formed with a sight opening, a cylinder rotatably mounted in said casing and marked to form a chart viewed through the sight opening and having movement across the sight opening when the cylinder is rotated, a transparent closure for the sight opening, ribs extending along upper and lower edges of said sight opening and constituting carriers for said closure, and an open frame slidable along said ribs in front of said closure and formed with a finger whereby towns upon a portion of the map visible through the sight opening may be easily located.

3. In a road map, a casing formed with a sight opening, a cylinder rotatably mounted in said casing and marked to form a chart viewed through the sight opening and having movement across the sight opening when the cylinder is rotated, a transparent closure for the sight opening, an open frame slidable along said casing in front of said closure and formed with a finger whereby towns upon a portion of the map visible through the sight opening may be easily located, and a lamp carried by said frame and including a bulb socket and carrier for the socket constituting a reflector for directing light inwardly through the sight opening.

4. In a road map, a casing consisting of a main section open at its front and an auxiliary section releasably secured in closing relation to the open front of the main section, the auxiliary section having a front wall formed with an elongated sight opening, a chart inserted into the main casing section when the auxiliary casing section is removed and movably mounted therein, the chart being visible through the sight opening when the auxiliary section is in place, and a pointer mounted in front of the sight opening and slidable longitudinally thereof.

5. In a road map, a casing consisting of a main section open at its front and an auxiliary section releasably secured in closing relation to the open front of the main section, the auxiliary section having a front wall formed with an elongated sight opening, a chart inserted into the main casing section when the auxiliary casing section is removed and movably mounted therein, the chart being visible through the sight opening when the auxiliary section is in place, a slot being formed in the front wall of the auxiliary section, a map extending through said slot and having a roller rotatably mounted in the auxiliary section, and a shield for said map disposed in the auxiliary section in covering relation to the map.

6. In a road map, a casing consisting of a main section open at its front and an auxiliary section releasably secured in closing relation to the open front of the main section, the auxiliary section having a front wall formed with an elongated sight opening, a cylindrical chart insertible into the main casing section when the auxiliary casing section is removed and having an axially extending shaft rotatably engaged in seats formed in end walls of the main section and projecting outwardly from one end wall, a latch movable into and out of engagement with the shaft, the chart being visible through the sight opening when the auxiliary section is in place, and a pointer mounted in front of the sight opening and slidable longitudinally thereof.

In testimony whereof I affix my signature.

ORLANDO V. EDGERTON. [L. S.]